(12) United States Patent
Moore et al.

(10) Patent No.: US 8,156,985 B2
(45) Date of Patent: Apr. 17, 2012

(54) METHOD AND MEANS FOR ASSEMBLY OF HIGH PRECISION ULTRA-HIGH SPEED CRYSTAL SCANNING HEADS

(76) Inventors: Matthew David Moore, Everett, WA (US); Joanna Aleksandra Szydlo-Moore, Everett, WA (US)

( * ) Notice: Subject to any disclaimer, the term of this patent is extended or adjusted under 35 U.S.C. 154(b) by 1072 days.

(21) Appl. No.: 12/074,850

(22) Filed: Mar. 7, 2008

(65) Prior Publication Data

US 2009/0223634 A1  Sep. 10, 2009

(51) Int. Cl.
*B32B 41/00* (2006.01)
(52) U.S. Cl. .................................. 156/379.6
(58) Field of Classification Search ........... 156/378, 156/379, 379.6, 379.8, 380.9, 578; 356/508
See application file for complete search history.

(56) References Cited

U.S. PATENT DOCUMENTS 7,170,603 B2 *  1/2007  Katayama ................ 356/399
* cited by examiner

*Primary Examiner* — Richard Crispino
*Assistant Examiner* — Daniel McNally

(57) ABSTRACT

Demand is growing for affordable advanced sensor systems for use in counter-terrorism, criminal forensic analysis, and medical diagnosis. Next generation, million RPM class laser interferometry and spectrometry scanning systems are the ideal solution for this need due to their inherent ability to detect and identify microscopic quantities of evidence and resolve microscopic detail however a means to produce these systems with sufficient precision efficiently and inexpensively has been elusive. The scanning head is the heart of the system and in order for scanning heads of million RPM rotational speed class to be precisely aligned and balanced at operational speed they must be assembled while rotating. To facilitate this, a fully integrated feed-back based assembly system that measures and corrects optical alignment and balance of the scanning head during final assembly has been devised that subsequently enables economical high-precision, high production rate assembly.

26 Claims, 5 Drawing Sheets

(CONTAINS PRIOR ART)

(CONTAINS PRIOR ART)

(CONTAINS PRIOR ART)

(CONTAINS PRIOR ART)

METHOD AND MEANS FOR ASSEMBLY OF HIGH PRECISION ULTRA-HIGH SPEED CRYSTAL SCANNING HEADS

FIELD

This invention relates to the field of ultra-high definition laser interferometry and spectrometry. Specifically, a method and means for the manufacturing, produce-ability and assembly of scanning heads in the rotational speed class of over one million rotations per minute, including subcomponents that simultaneously satisfies the technical requirements for ultra-high speed scanning along with cost and assembly rate characteristics sufficient to enable economic viability.

BACKGROUND

Potential customers of new ultra-high speed scanning systems have communicated a clear need for low unit cost given the anticipated quantity of devices needed for world-wide counter-terrorism efforts. A limiting factor in the practical and economical implementation of prior art ultra high speed (million RPM class) scanning systems is an assembly method for the most sensitive components that provides the necessary tolerance and precision required for high speed, high fidelity measurements, and production rates and efficiencies needed for low cost. This invention presents a viable method for efficient and economical manufacture of prior art ultra high speed scanning heads, which are the critical component of the prior art ultra high speed scanning system.

While the magnitude of scanning and therefore assembly precision is established by the highest speed scanning heads, this method and means is readily adaptable to lower speed scanning heads.

SUMMARY

In accordance with an embodiment of the present invention, a scanning head includes a crystal, crystal housing, and drive system components. An assembled and fully balanced scanning head is the product of the process.

A feedback based autonomous process is employed to assemble the crystal and crystal housing. The primary components and key aspects of the assembly process are summarized as follows. The crystal housing, drive shaft and motor are assumed to be pre-assembled and dynamically balanced up to the design speed of the system including factors of safety at this stage of the process.

A specialized, computer controlled adhesive applicator applies a spatially calibrated quantity of adhesive into the crystal housing. The adhesive applicator tip is of modular configuration, so that crystal housing recesses of differing geometries. Preferred adhesives for this method include slow-cure high tensile strength adhesives to support the demands of ultra-high rotational speed; and new advanced adhesives whose cure process can be controlled by external stimuli such as ultraviolet light. A high precision robotic device is used to transport the crystal from the supply source and insert it into the recess in the crystal housing without depressing force once the crystal housing recess is impregnated with adhesive.

A crystal alignment and leveling system consisting of a plurality of pressure instrumented and feedback controlled probes is positioned above the inserted crystal and then lowered to a calibrated contact position. The tips of the positioning probes can have different configurations. For lower rotational speeds, softer crystal materials, or low production applications where infrequent service is required the preferred probe tip configuration assumes a low friction compound such as Teflon. For applications where crystal wear and damage could be a concern due to higher rotational speeds, choice of crystal material, or where long and continuous production is required the preferred probe configuration contains high-pressure gas jets which impart force on the crystal via pneumatic pressure to correct the displacement and laser beam trajectory.

The balancing process is initiated by rotating the crystal housing at high speed. The preferred rotational curing speed avoids adhesive centrifuging and system mechanical resonances. While under rotation a laser or plurality of laser sources projects a beam or beams into the center of the crystal. A plurality of laser receptors is positioned in the path of the reflected laser beams. The receptors provide multi-dimensional beam trajectory data to a computer which compares actual trajectory to a perfectly aligned trajectory. The computer then calculates corrective displacements to the positioning probes which exert force on the crystal to correct the laser trajectory. Once a fully corrected trajectory is achieved the system maintains rotational speed and crystal position until the glue is fully cured.

The process for UV or other adhesive curing through light radiation is comparable with the exception that the curing light application process is integrated with the laser light trajectory correction system. Specifically, the integration includes sequencing logic both to prevent interference between the UV curing light and the laser radiation, and also to tailor the curing characteristics of the adhesive for optimal balancing. The curing light also has strategic focusing capability so that critical adhesive regions can be cured, thereby maximizing balance precision. Once cured, the completed crystal housing and crystal assembly is ready for distribution and incorporation into the scanning system.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
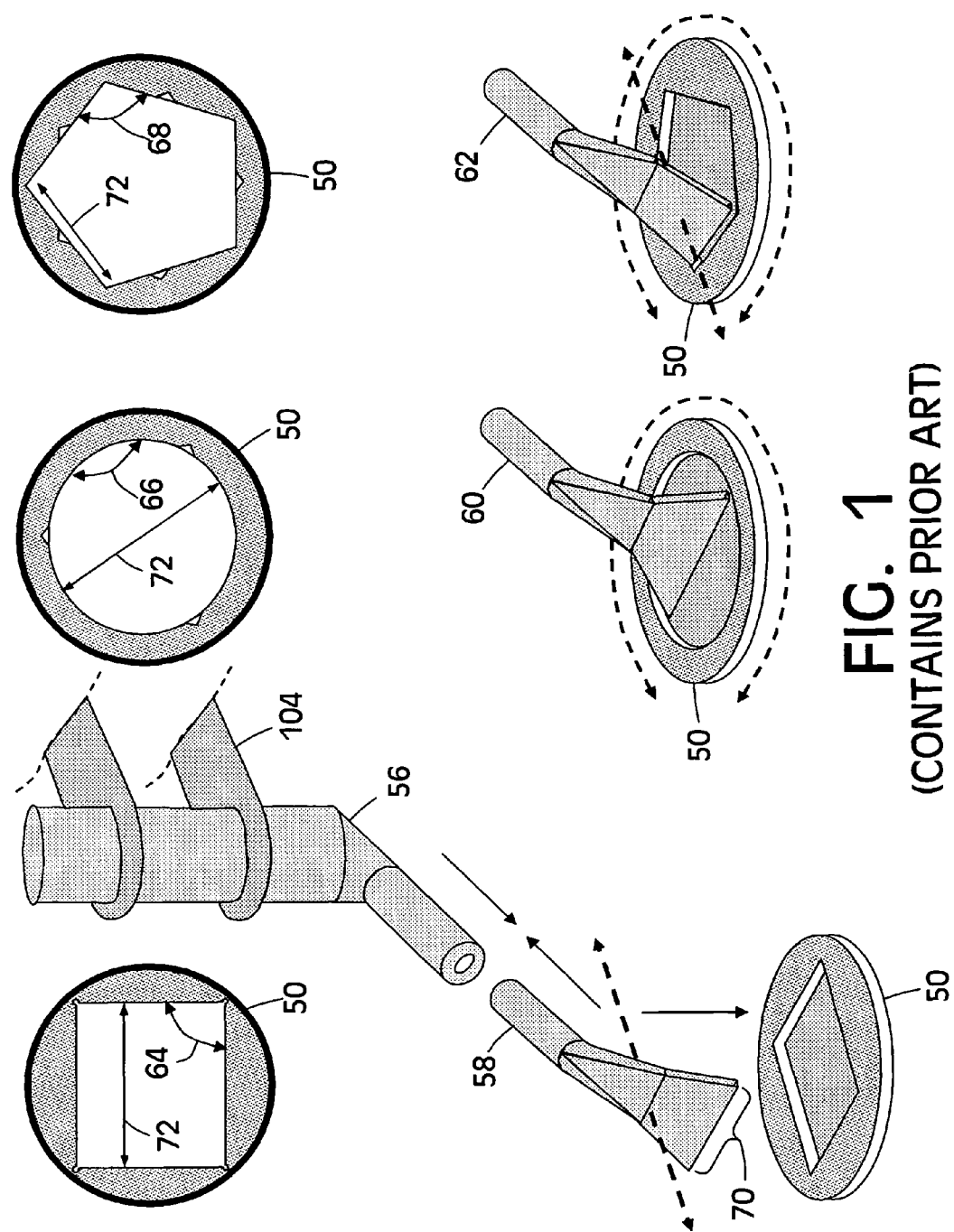
FIG. 1 is a top view depiction of several prior art crystal housing recess shapes along with isometric views of the crystal housings with their corresponding preferred modular adhesive applicator.
Figure 2:
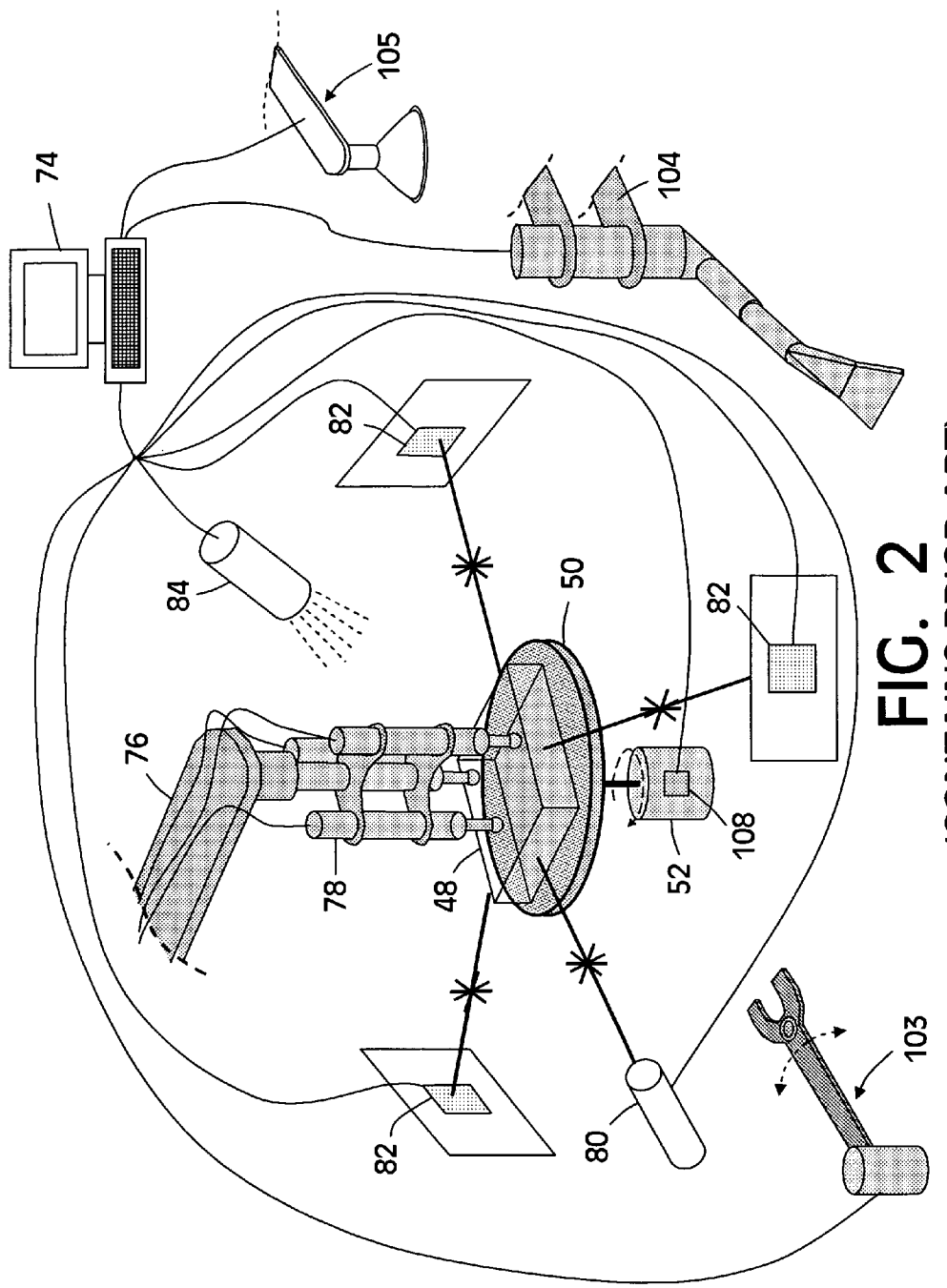
FIG. 2 is a schematic diagram of the comprehensive crystal alignment system including the laser light source, alternate light curing source, crystal housing transport system, crystal transport and insertion system, crystal drive system, integrated laser trajectory measurement system, adhesive applicator transport system, adhesive applicator, crystal displacement system, CPU, and a prior art crystal and crystal housing assembly.
Figure 3:
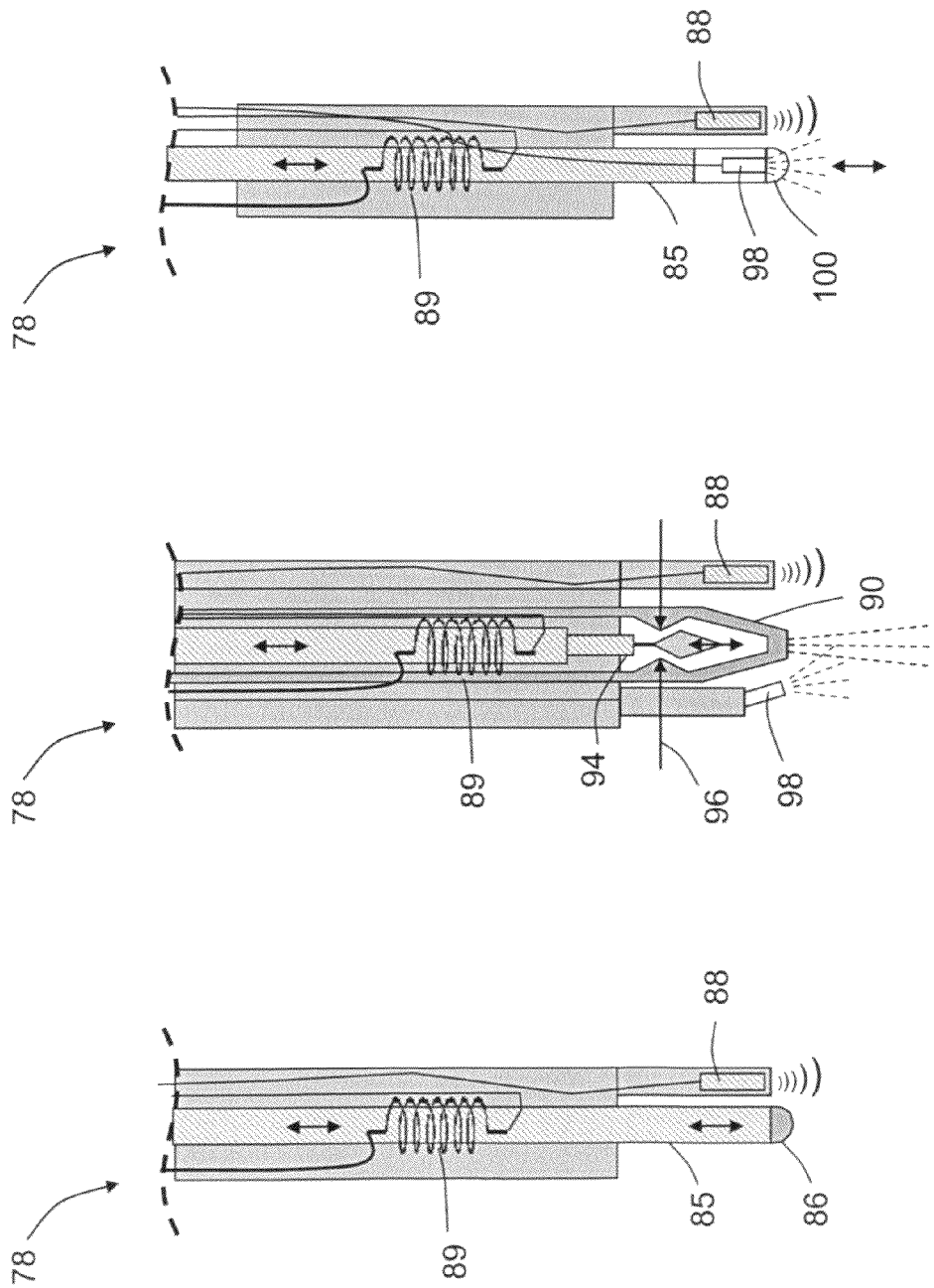
FIG. 3 is a 2-D cross-section of the crystal positioning probes.
Figure 4:
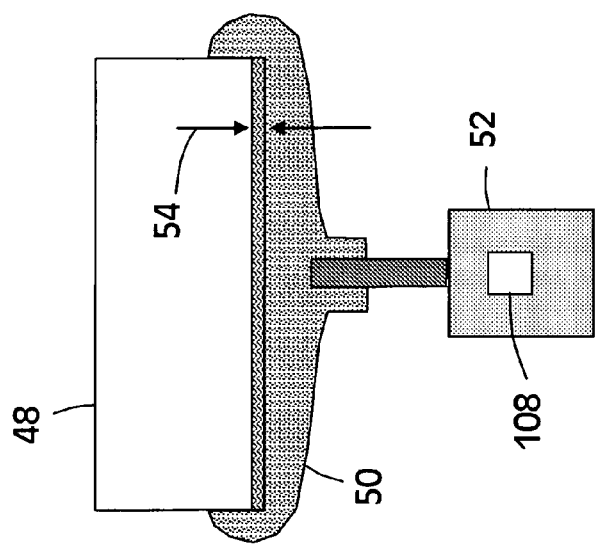
FIG. 4 is a 2-D cross-section of a prior art crystal and crystal housing assembly connected to a high speed crystal housing drive system with multi-axes imbalance sensor.

The key systems of this invention are the integrated adhesive applicator assembly 56, 58, 60, 62 FIG. 1, and the comprehensive integrated high-precision crystal displacement alignment system FIG. 2 and crystal displacement systems 78 FIG. 3. The final product FIG. 4 includes a crystal 48, attached to a crystal housing 50 with a thin layer of adhesive 54 that is operatively attached to a drive system 52 of preferred angular resolution capability of less than 0.1 degree, a multi-axes vibration sensor 108, and drive system 52 program logic within CPU 74 that has fully variable speed control with reverse capability and high speed rotation during final cure.

The adhesive applicator 56 system of FIG. 1 utilizes a plurality of modular applicator tips 58, 60, 62 that are tailored to enable even adhesive 54 application to crystal recesses of arbitrary shape 64, 66, 68, and also to enable convenient replacement in the event the tip 70 becomes clogged. The preferred width of the applicator tip 70 is two percent less than the minimum characteristic dimension of the crystal housing recess 72 to allow for insertion clearance and reduced overall process time.

The principle elements of the comprehensive integrated crystal positioning apparatus of FIG. 2 are the crystal housing 50, crystal housing drive system 52, CPU 74, adhesive application system transport carriage 104 with adhesive applicator 56 and modular tips 58, 60, 62, crystal positioning system transport carriage 76 with crystal displacement system 78, a plurality of positioning laser(s) 80, a plurality of laser receptors 82, an optional adhesive curing light 84, robotic crystal housing transport arm 103, and the robotic crystal transport and insertion system 105.

The preferred quantity of crystal displacement systems 78 is equal to the quantity of laser receptors 82. The preferred orientation of the crystal displacement systems 78 is such that each individual displacement system is equidistant angularly relative to the center of the crystal 48 between the laser receptors 82. All of these elements are operatively connected to and controlled by the CPU 74. The CPU 74 is programmed with algorithms that perform the integrated functions of precisely dispensing metered quantities of adhesive 54, controlling the crystal housing drive motor 52, and aligning and balancing the crystal 48.

The crystal displacement systems 78 of FIG. 3 are of two preferred configurations. The primary type of displacement system exerts direct pressure on the crystal 48 via physical contact. Friction and abrasion between the displacement probe 85 and the crystal 48 is minimized by use of a low friction material on the tip 86 such as Teflon. This probe is also equipped with a displacement measuring probe 88 that is operatively connected to the CPU 74. The displacement measuring probe 88 utilizes non-interfering signal and signal detection systems such as ultrasound, as a laser based system could interfere with the crystal positioning lasers 80. The preferred displacement precision for the mechanical contact probes 86 is micrometer precision. The second type of positioning probe is a pneumatic probe 90 that uses gas pressure to displace the crystal 48. The preferred gas is a heavy inert gas in order to exert maximum displacement force and avoid any unnecessary introduction of Oxygen or other reactants into the system. Preferred gasses include Argon or Krypton however Nitrogen can be considered to reduce cost if it is inert relative to other components.

Gas pressure is controlled or throttled via valves 94 and controlled throat 96 area capability. The pneumatic probe also utilizes the same type of displacement measurement probe 88 as the direct contact displacement probe. Linear Variable Differential Transformer systems 89 are shown both for actuation of the valve 94 and the throat 96 plug however other displacement technologies can be used if greater performance, control and precision are possible.

When use of light cured adhesives is preferred either of the previously discussed positioning systems can be used, with the exception that they are augmented with a integrated curing light source 98 that is operatively connected to the CPU 74. For crystal displacement with direct physical contact a shorter displacement probe 85 is used to accommodate an embedded curing light source 98. The Teflon tip 86 is replaced with a transparent material such as highly-polished diamond 100. Natural or synthetic diamond is acceptable. The second option attaches an adhesive curing light source to the side of pneumatic nozzle 90. The curing light source 98 is focused at the point of contact.

The crystal alignment process follows. At the very beginning of the process an integrated robotic crystal housing transport arm 103 operatively connected to the CPU 74 acquires a pre-assembled empty crystal housing 50 and drive assembly 52 from their supply source and transports them into position. The adhesive applicator control arm 104 positions the applicator assembly 56 with pre-selected applicator tip 58, 60, 62 at its pre-defined reference point within the crystal housing 50 recess. For polygon crystal housing 50 recesses 64, 68 the reference position point for the adhesive applicator is identified as the position where the applicator tip is against one side of the crystal housing 50 recess 64, 68. For circular recesses 66 the center of the crystal housing 50 is the reference position. For all types of crystal housings 50 the vertical component of reference point is one millimeter above the bottom, or floor of the crystal housing 50 recess 64, 66, 68.

Two primary adhesive application programs are employed and administered by the CPU 74. The Polygon program can be generally described as a sequence of inwardly directed adhesive strokes that number in the same quantity as the number of polygon faces. Specifically, once positive adhesive flow is indicated the adhesive applicator control arm pulls the applicator toward the center of the crystal housing 50 recess 64, 66, 68. The quantity of adhesive is decreased as the applicator approaches the center of the crystal housing 50 recess 64, 66, 68 to ensure even application and prevent adhesive buildup in the center of the housing. When the center of the crystal housing 50 recess 64, 66, 68 is reached a slight vacuum is applied to the applicator assembly 56, 58, 60, 62 to eliminate dripping and then the repositioning sequence commences. During this repositioning sequence the applicator assembly 56, 58, 60, 62 is raised and the crystal housing drive motor 52 rotates the crystal housing 50 until the next face of the polygon within the recess 64, 68 is aligned. When the adhesive application is totally complete a slight vacuum is applied again to the applicator assembly 56, 58, 60, 62 and the adhesive applicator control arm 104 retracts the applicator assembly 56, 58, 60, 62 and positions the applicator assembly 56, 58, 60, 62 in an inerting chamber charged with inerting gas specific to the preferred adhesive 54 that prevents curing while the crystal 48 is being positioned. The inerting gas can be temperature controlled if this further assists cure prevention.

At the same time the adhesive 54 application begins the integrated high-precision robotic crystal transport and insertion system 105 obtains a crystal 48 and positions it at a holding position close to the adhesive application system 56, 58, 60, 62. Once the adhesive application process is complete the crystal 48 is immediately inserted into the recess 64, 66, 68 and the crystal transport arm 105 is retracted. The preferred insertion orientation is parallel with the floor of the crystal housing 50 recess 64, 66, 68 and the preferred insertion orientation depth is sufficient for the adhesive 54 just to make initial contact with the under-side of the crystal 48.

Figure 5:
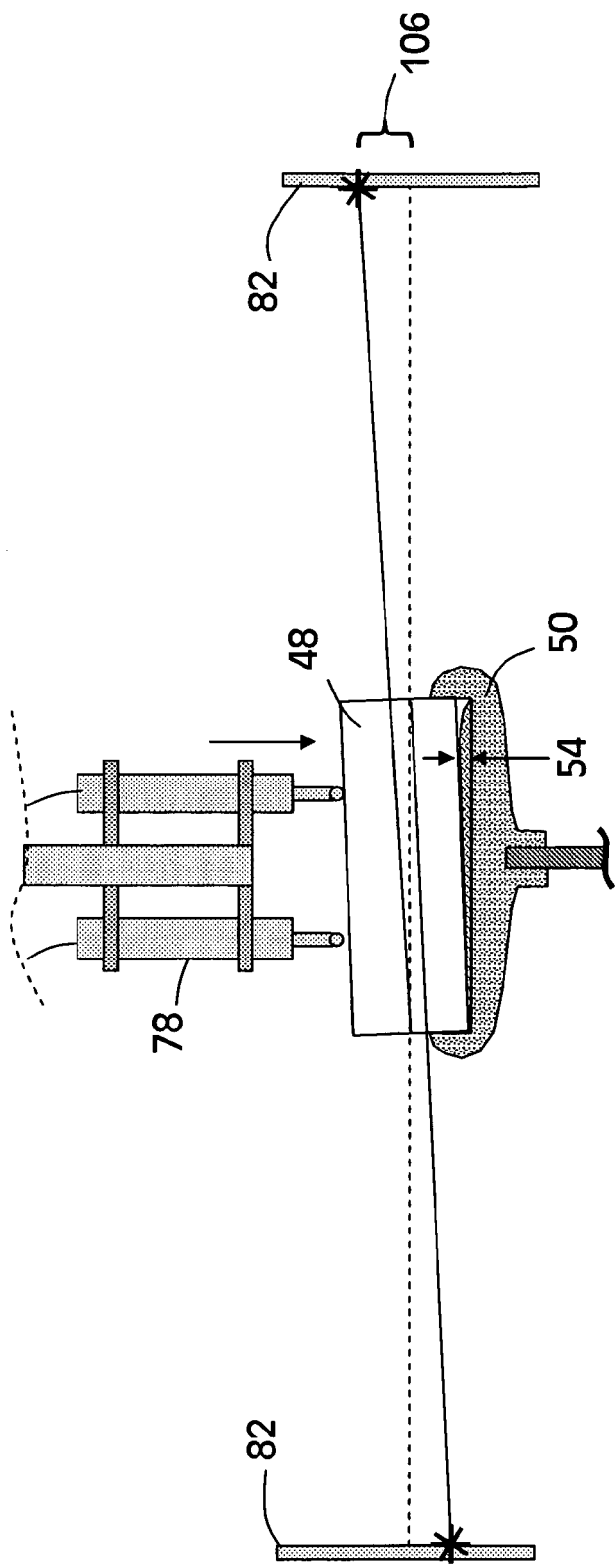
FIG. 5 is a 2-D cross-section of a prior art crystal housing with misaligned prior art crystal, laser trajectory sensors, and crystal displacement probes.

At this time the positioning probe transport carriage 76 transports the crystal displacement systems 78 to the reference point directly above the surface of the crystal 48. The probes 78 are lowered to a point of initial contact and the laser 80 is activated as represented in FIG. 5. Once laser signals are detected at all of the laser receptors 82 the alignment/balancing program is initiated and the crystal housing 50 begins to turn. Once the rotational speed is stable the system evaluates imbalance via sensors 108 located on the crystal drive system 52 and misalignment via laser receptors 82. If imbalance modes are sufficient to be observed in the laser receptors 82 the program is terminated and the items being assembled are discarded. If the imbalance stays within acceptable ranges the program in the CPU 74 records error alignment displacements 106 and calculates corrective crystal 48 displacements and applies via the crystal displacement systems 78. The corrective crystal 48 displacements are all triggered at the same time to prevent adhesive elastic 54 crystal 48 counter-displacement reaction. While the corrective displacement signal given to the crystal displacement probe 78 is calculated to offset the measured alignment displacement 106, the adhesive 54 may exhibit some slight elastic reaction behavior before it cures. The continued application of corrective displacements ensures a fully corrected position when the adhesive 54 is set. Success criteria is achieved once all of the laser detectors 82 are indicating measured displacement error 106 is preferably less than one-tenth of desired measurement resolution and the multi-axis vibration detector 108 on the crystal housing drive system 52 reflects out-of-balance force magnitudes preferably less than 0.00001 of the standard g-force for the maximum design rotational speed. Greater imbalance can be accepted as the crystal 48 rotational design speed is decreased however minimum imbalance is always preferred. If the crystal 48 is fully aligned yet the assembled system remains to be out of balance the product is rejected.

A novel provision of this invention is the option for use of light-cure adhesives. In this provision, the adhesive 54 is applied using the exact same process as conventional adhesives. The main difference comes in the design of the crystal displacement systems 78. To take advantage of light-cure adhesive, curing must occur at the precise time that optimal alignment and balance is achieved. To facilitate this, two designs are employed.

For contact-based crystal displacement probes 78 using light cure adhesive a shorter displacement probe 85 is fitted with an integrated curing light source 98 operatively connected to the CPU 74 for the light cure adhesive 54. The Teflon tip 85 is replaced with a non-abrasive round clear cap 100. The cap 100 is preferably made of polished diamond however alternative materials can be considered provided the general requirements for light transmission and surface smoothness are met.

For pneumatic displacement probes 78 utilizing light cure adhesive, each nozzle 90 is fitted with an integrated curing light source 98 that is focused at the center of the point of where the gas-jet impacts the crystal 48. For both contact and pneumatic applications an additional array of curing floodlights 84 is positioned for final adhesive 54 cure once the localized cure is accomplished by the positioning probe lights 98.

The adhesive curing light sources 84, 98 are operatively connected to the CPU 74. Specifically, once the CPU 74 has calculated that the crystal displacement probes 78 have properly aligned the crystal 48, the adhesive curing lights 98 at the probe tips 100 are actuated to provide rapid localized adhesive curing light to fix the alignment of the assembly. Once alignment is verified the crystal is flooded with curing light 84 to solidify the adhesive layer. To ensure prevention of interference between the positioning lasers 80 and curing lights 84, 98 the controls of both have phasing logic that enables synchronized light application. Furthermore, for all crystal displacement systems 78, CPU 74 has protection logic. Specifically, if for any reason the adhesive 54 cures prematurely or incorrectly the process will cease and the assembled parts are rejected. The CPU 74 can determine this for example if the crystal 48 displacements measured by the displacement sensors 88 cease to change and a misalignment 106 or imbalance via the multi-axes imbalance sensor 108 is still indicated.

What is claimed is:

1. An integrated crystal positioning and alignment system comprising: a plurality of integrated laser light sources for alignment and balance correction; a plurality of laser receptors; a plurality of modular instrumented and actuated crystal displacement probes; a CPU; a crystal housing transport and placement system; an integrated adhesive application system; a displacement probe transport system; a crystal transport and insertion system; and a plurality of integrated curing light sources for adhesive curing.

2. The integrated crystal positioning and alignment system of claim 1, wherein an integrated adhesive application system is used to apply spatially and quantity controlled quantities of adhesive into a crystal housing.

3. The integrated crystal positioning and alignment system of claim 2, comprising a plurality of modular tips to mate with crystal housing shapes of arbitrary shape.

4. The integrated crystal positioning and alignment system of claim 2, wherein a slight vacuum is utilized after adhesive application to prevent adhesive drip.

5. The integrated crystal positioning and alignment system of claim 2, wherein a flow-path of an adhesive applicator tip ensures uniform adhesive flow.

6. The integrated crystal positioning and alignment system of claim 2, wherein a reference point within a crystal housing recess to begin adhesive application is located against one side of a polygon for polygon shaped crystal housing recesses.

7. The integrated crystal positioning and alignment system of claim 2, wherein a reference point within a crystal housing recess to begin adhesive application is located at a center of a crystal housing recess for generally circular shaped crystal housing recesses.

8. The integrated crystal positioning and alignment system of claim 2, wherein a schedule of gradual inward adhesive flow reduction is utilized for polygon shaped crystal recesses to ensure even radial adhesive application.

9. The integrated crystal positioning and alignment system of claim 1, wherein a plurality of integrated crystal displacement probes provide corrective displacement for alignment of a crystal.

10. The integrated crystal positioning and alignment system of claim 9, wherein the quantity of displacement probes is equal to the number of laser receptors.

11. The integrated crystal positioning and alignment system of claim 9, wherein the angular orientation of the positioning probes is of substantially equal angular spacing between the laser receptors.

12. The integrated crystal positioning and alignment system of claim 9, further comprising a sensor that measures crystal displacement distance.

13. The integrated crystal positioning and alignment system of claim 9, further comprising a replaceable tip, with integrated light cure adhesive light source and transparent contact lens tip.

14. The integrated crystal positioning and alignment system of claim 1, wherein a plurality of laser receptors that detect laser trajectory and transmit data to the CPU are positioned about the periphery of an assembled crystal and crystal housing.

15. The integrated crystal positioning and alignment system of claim 14, being operatively connected to the CPU.

16. The integrated crystal positioning and alignment system of claim 14, wherein optical alignment data is measured and transmitted to the CPU.

17. The integrated crystal positioning and alignment system of claim 1, wherein a plurality of laser light sources operatively connected to the CPU project laser light through the crystal to establish optical alignment.

18. The integrated crystal positioning and alignment system of claim 17, wherein the laser light can be of continuous exposure or sequenced.

19. The integrated crystal positioning and alignment system of claim 1, wherein a CPU is operatively connected to the crystal displacement probes, crystal displacement sensors, laser light source, laser detectors, crystal housing drive system, crystal housing imbalance sensor, adhesive application system, crystal positioning system, probe positioning system, and light cure adhesive source.

20. The integrated crystal positioning and alignment system of claim 1, wherein a crystal housing transport and placement system obtains an assembled crystal housing and drive system, and transports the assembly into position for adhesive application.

21. The integrated crystal positioning and alignment system of claim 1, wherein an integrated transport and insertion system is used to obtain a crystal and place the crystal into a crystal housing recess once an adhesive application process is complete.

22. The integrated crystal positioning and alignment system of claim 1, wherein an integrated probe positioning system aligns the crystal displacement probes with a crystal after the crystal is inserted into an adhesive impregnated crystal housing.

23. The integrated crystal positioning and alignment system of claim 1, wherein integrated light sources for use with light cure adhesives are operatively connected to the CPU.

24. The integrated crystal positioning and alignment system of claim 1, wherein a displacement based crystal alignment process termination algorithm terminates a crystal alignment process if crystal displacement ceases prior to ideal crystal alignment.

25. The integrated crystal positioning and alignment system of claim 1, wherein an imbalance based crystal alignment process termination algorithm terminates a crystal alignment process if a magnitude of imbalance is substantially greater than 0.00001 g for design rotational speeds equal to or greater than 1 million rotations per minute when a crystal alignment is achieved or when an adhesive has cured.

26. The integrated crystal positioning system of claim 1, wherein a crystal alignment error is substantially less than one tenth of the ultra-high speed scanning system design measurement resolution.

* * * * *